(12) United States Patent
Pierson et al.

(10) Patent No.: US 11,540,903 B2
(45) Date of Patent: Jan. 3, 2023

(54) DENTAL REPARATIVE ARTICLE AND METHOD OF MANUFACTURING AND INSTALLING

(71) Applicants: Kenneth W. Pierson, Visalia, CA (US); Rick White, Woodland, WA (US)

(72) Inventors: Kenneth W. Pierson, Visalia, CA (US); Rick White, Woodland, WA (US)

(*) Notice: Subject to any disclaimer, the term of this patent is extended or adjusted under 35 U.S.C. 154(b) by 170 days.

(21) Appl. No.: 16/868,656

(22) Filed: May 7, 2020

(65) Prior Publication Data

US 2021/0346126 A1    Nov. 11, 2021

(51) Int. Cl.
*A61C 5/77* (2017.01)
*A61C 5/60* (2017.01)

(52) U.S. Cl.
CPC .............. *A61C 5/77* (2017.02); *A61C 5/60* (2017.02); *A61C 2201/002* (2013.01)

(58) Field of Classification Search
CPC .... A61C 5/77; A61C 5/60; A61C 5/73; A61C 2201/002
USPC .......................................................... 433/183
See application file for complete search history.

(56) References Cited

U.S. PATENT DOCUMENTS

| | | | | |
|---|---|---|---|---|
| 2,031,996 | A * | 2/1936 | Zelesnick | A61C 5/77 433/222.1 |
| 4,424,034 | A * | 1/1984 | Korwin | A61C 9/00 433/40 |
| 4,778,386 | A * | 10/1988 | Spiry | A61C 5/77 433/45 |
| 5,951,294 | A * | 9/1999 | Pierson | A61C 5/77 433/218 |
| 2005/0244770 | A1* | 11/2005 | Worthington | A61C 13/0003 433/6 |
| 2015/0111172 | A1* | 4/2015 | Jung | A61C 5/77 433/172 |
| 2017/0143457 | A1* | 5/2017 | Taub | A61C 9/0053 |

* cited by examiner

*Primary Examiner* — Matthew M Nelson
(74) *Attorney, Agent, or Firm* — Emerson, Thomson & Bennett, LLC; Roger D. Emerson

(57) ABSTRACT

A crown for a damaged tooth is manufactured via metal injection molding and features an opening into which can be applied flowable dual-cure tooth colored material.

7 Claims, 8 Drawing Sheets

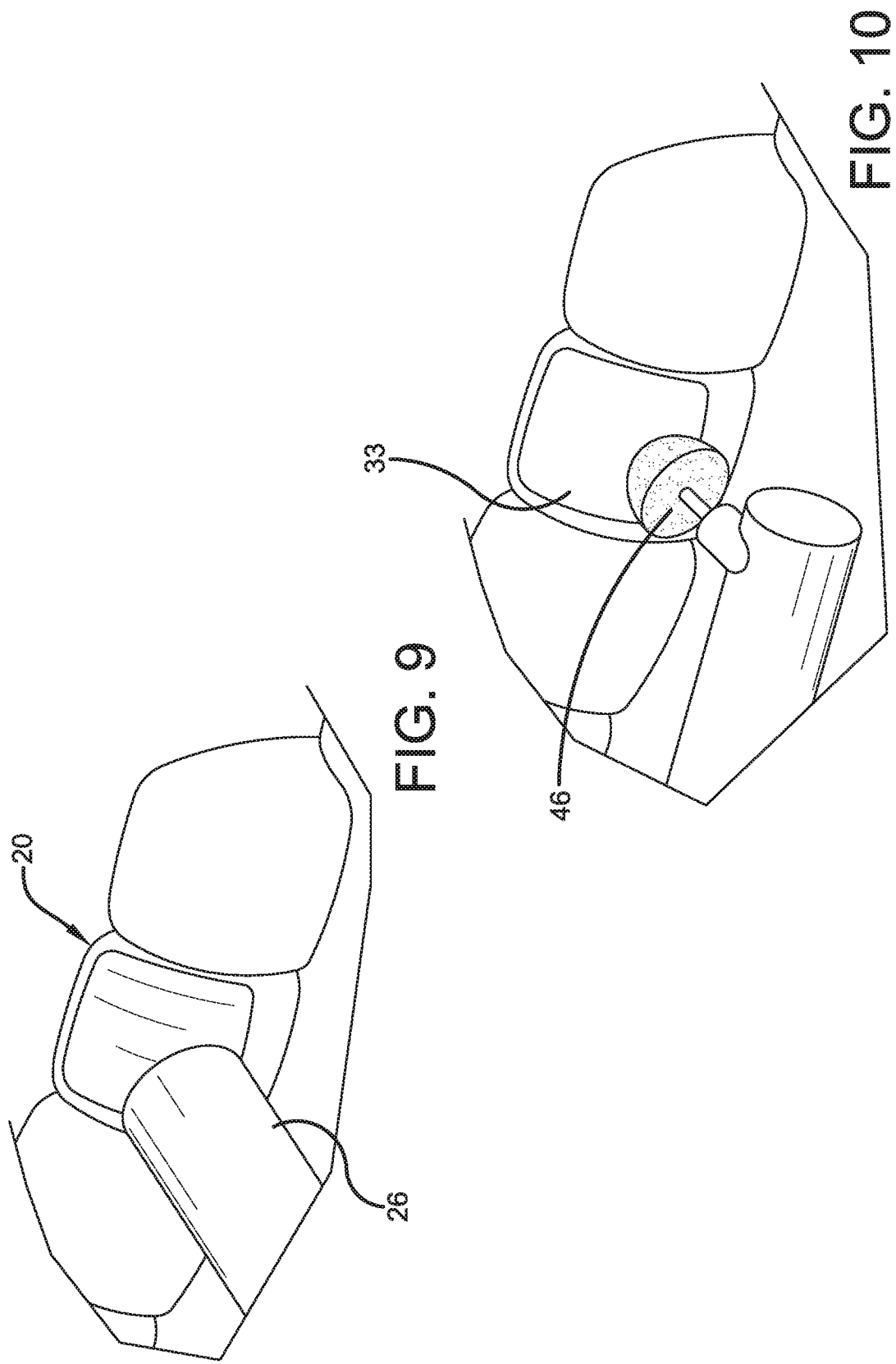

DENTAL REPARATIVE ARTICLE AND METHOD OF MANUFACTURING AND INSTALLING

The present invention relates generally to restorative dentistry and, more particularly, to the interim restoration of a damaged anterior tooth, including a primary tooth. The invention includes a novel manufacturing method to manufacture a crown, the novel crown itself, and a novel method of installing the crown onto a patient's tooth.

BACKGROUND OF THE INVENTION

1. Field of the Invention

It is common for a patient to damage a tooth, whether it be a crack in the enamel, a chip, decay or some other typical visually unattractive damage, the repair of which can be important to health as well as the patient's appearance and self-esteem. Children, as well as adults, damage teeth.

Clearly the health of the patient is an important consideration, but whether an adult, or a child in its formative years, self-esteem, as a function of physical appearance, cannot be discounted or overlooked. Whereas an adult will often opt for a more expensive restoration, primarily because of appearance, it is not uncommon for dentists to use the effective, but unattractive stainless-steel restorations.

As a consequence, there has been an increase in ongoing research relative to means of ameliorating the distractions that damage to an anterior tooth can present to a person. This invention is directed to alleviating that problem.

2. Overview of the Prior Art

One solution to the problem of a cracked, chipped or even broken anterior tooth has been to fit the damaged tooth with a stainless-steel crown.

In some cases, the visible metal, gold or steel, may be a distasteful and embarrassing distraction in one's appearance which can inhibit a smile, and detract from one's mood and, indeed, entire persona. It is important, therefore, that the dentist have available an alternative that permits the patient to retain, if not heighten, his or her level of self-esteem.

Wiedenfeld, who, in his U.S. Pat. No. 562,422 suggested a veneer constructed of a composite resin. The resin is, hopefully, adhered to a stainless-steel crown, which is etched to provide a surface that will receive and hold the resin.

Another approach to the problem is found in U.S. Pat. No. 5,538,429 to Mayclin who, with apparent focus on costs, suggests much the same approach as Wiedenfeld, i.e., cementing an overlay over a steel crown. Mayclin deviates from Wiedenfeld in that the overlay is provided with openings to permit the thickness of the completed crown to be thickened to enhance durability.

The patent to Zelesnick, U.S. Pat. No. 2,031,996, is a 1936 offering that teaches the cutting of a window in the face of a steel crown. The essence of Zelesnick is the provision of two or more anchors 11 which are intended to be imbedded in a porcelain layer that fits in the window with its edges between the cap and the tooth being restored. In this manner, a white porcelain layer is fashioned in a steel crown, presumably to reduce the amount of metal that will be seen by others as the person wearing such a restoration talks or smiles. It will be evident to even the casual observer, however, that a crown is present, and at least some metal will be apparent.

Of less significance in the environment of the present invention, yet part of the overall picture of the art, are those patents which provide a framework within which bonding materials may work to adhere a non-metallic cap to a metallic base.

Included in this art is the patent to Rieger, U.S. Pat. No. 4,846,718, which suggests a carrier cap, 12. Fung, in his U.S. Pat. No. 5,314,335 employs a wire mesh member 3, and Eldred U.S. Pat. No. 5,118,296 teaches a chemical composition which he refers to as his cohesion layer.

Finally, Burgess et al., in their U.S. Pat. No. 4,668,193, provides holes 4, as contrasted perhaps to the window of Zelesnick, to permit the securing of a veneer. Burgess et al., however, is relevant only to posterior teeth, where appearance is less relevant, and strength is vital.

As will become apparent from a reading of the forthcoming detailed description, none of these prior art efforts suggest the novel approach of the present invention.

SUMMARY OF THE INVENTION

The primary focus of the present invention is the provision of a method, at least on an interim basis, of effecting a cosmetic and structurally sound restoration of a damaged anterior tooth.

This is accomplished, in accordance with the present invention, by forming a specially designed crown in conformance with the profile of the damaged tooth. The crown is constructed by providing a scaffold which conforms to the tooth profile, and, additionally, is formed with a facial opening. The damaged tooth is prepared to receive a composite bonding or filling material which will ultimately bond the crown to the tooth. To this end, the internal surface of the scaffold is also treated to enhance the capacity of the crown form to bond to the tooth.

Adherence to the foregoing procedure will inevitably result, when the composite material is cured about the crown, in a restoration that closely approximates the appearance of a healthy tooth, thereby accomplishing the principal objective of the present invention.

Accordingly, it is another objective of the present invention to effect a cosmetically pleasing restoration of a damaged tooth in a manner which will not cause the young patient undue discomfort or require that he or she remain in an uncomfortable position for an extended period.

A further objective of the present invention is to effect the formation of a cosmetically pleasing crown for an anterior tooth which is structurally sufficient to withstand the use and abuse to which even a young patient might be likely to expose the crown during the normal activities of daily living without embarrassment or discomfort.

It is a distinct advantage, and thus another objective accomplished, by virtue of the ease with which the restoration of the present invention can be accomplished in a single visit, thus effecting further savings in time and money for the patient.

Yet another, and still further, objective of the present invention is to provide a restoration with all of the foregoing described attributes, at a cost which is less than the more conventional cast, or custom fit prosthesis, and is thus commensurate with the reality that the tooth being restored may not be permanent.

The foregoing, as well as other objectives and features will become apparent to those skilled in the art of restoration of anterior teeth from a reading of the following detailed description, taken in conjunction with the accompanying drawings, wherein:

BRIEF DESCRIPTION OF THE DRAWINGS

FIG. 10 illustrates the finishing and polishing process.

DETAILED DESCRIPTION OF A PREFERRED EMBODIMENT

Figure 1:
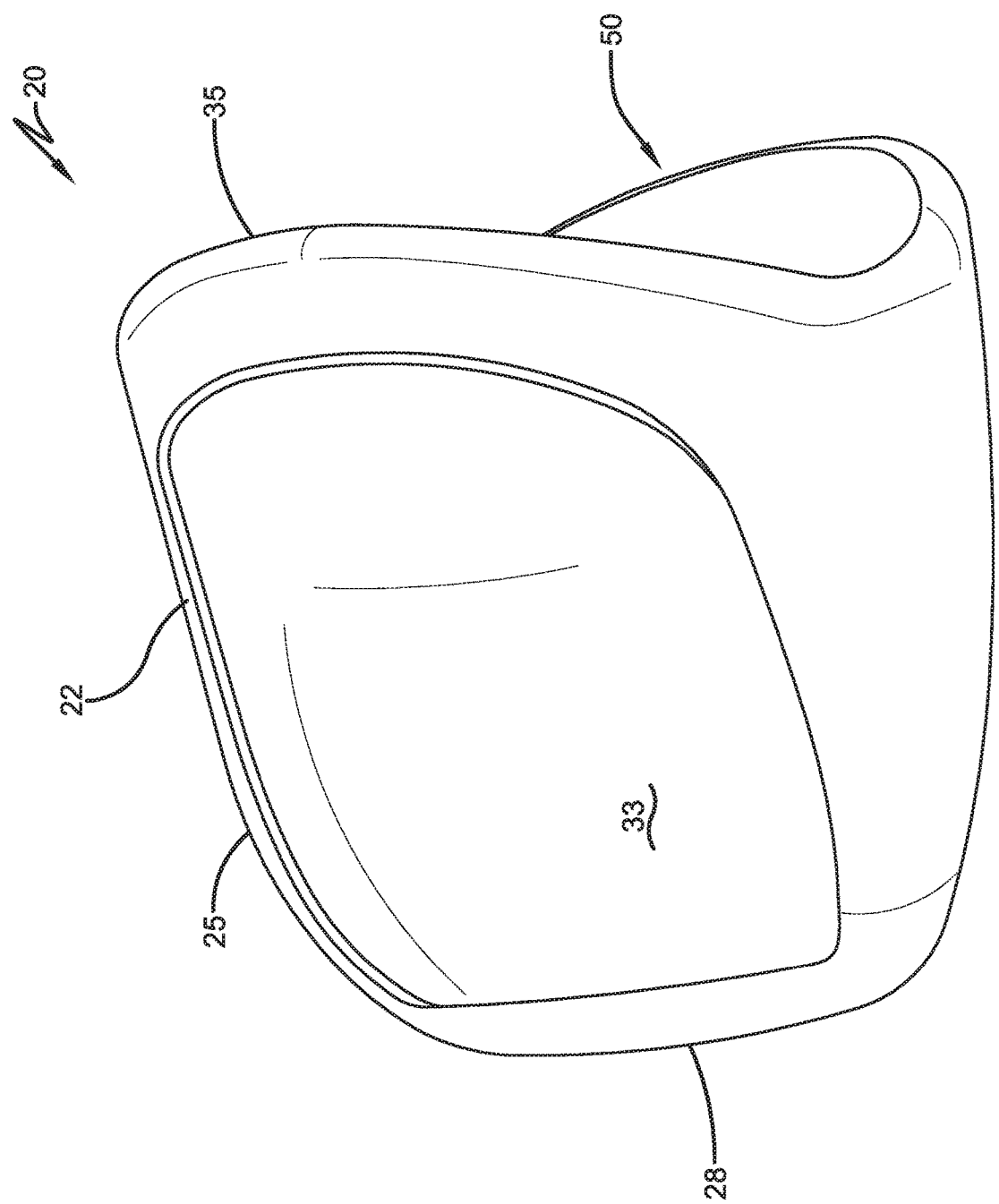
FIG. 1 is a side view of a crown formed in accordance with the present invention; and manufactured by the inventive method and further illustrating a facial opening in the scaffold.
Figure 2:
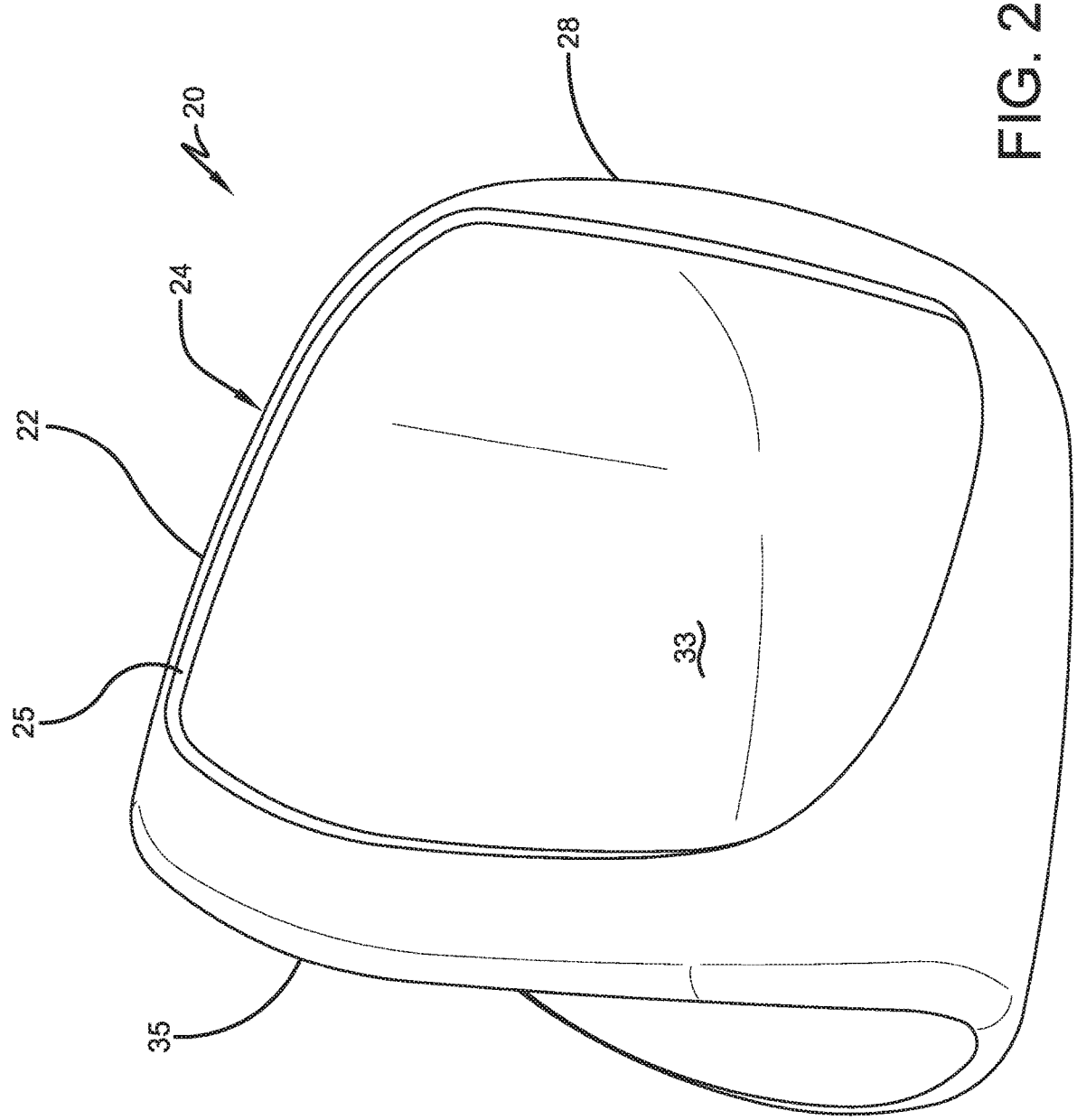
FIG. 2 is a perspective top view of the scaffold of FIG. 1.
Figure 3:
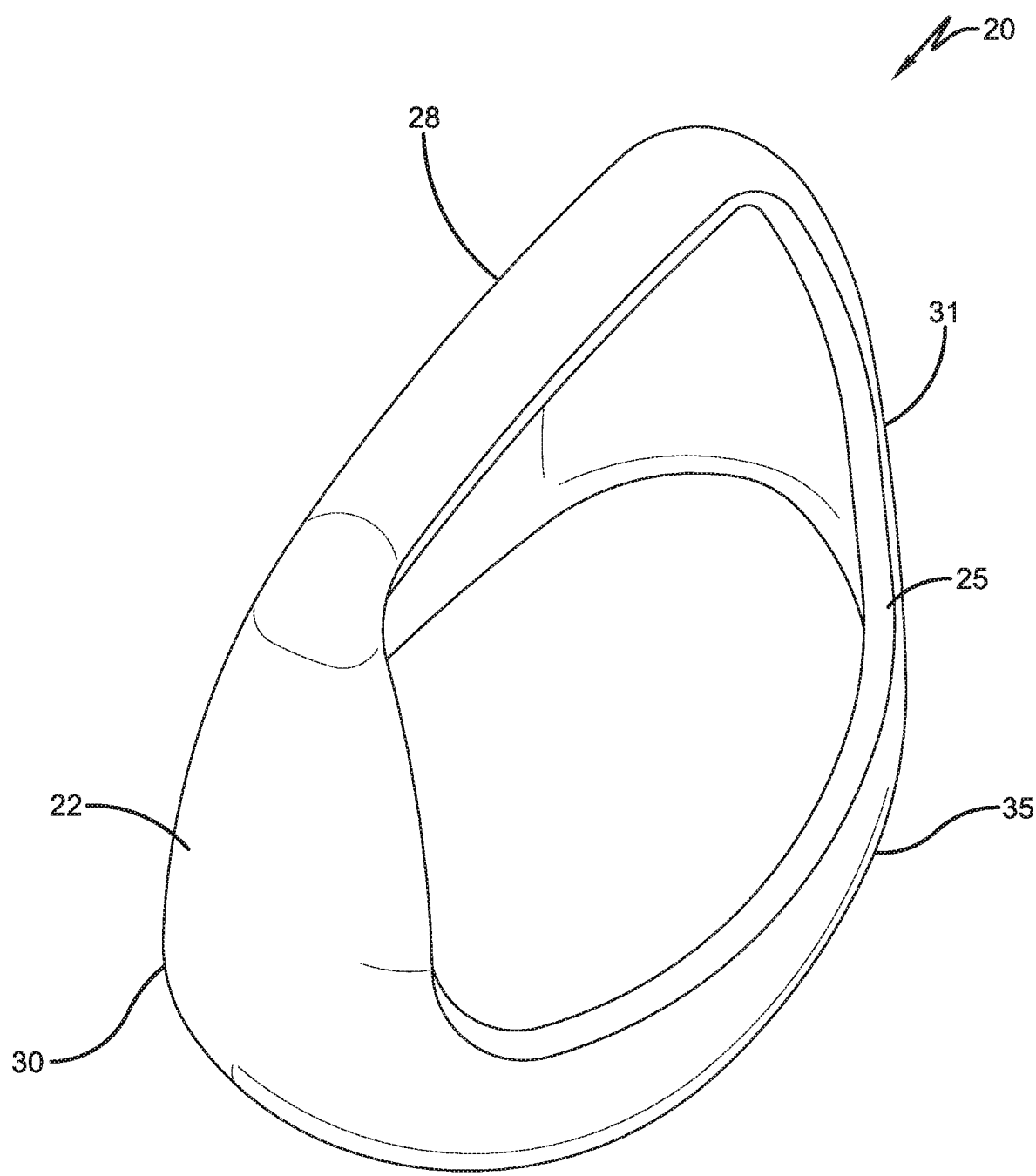
FIG. 3 is a view of the leading edge of the scaffold of FIG. 1.
Figure 4:
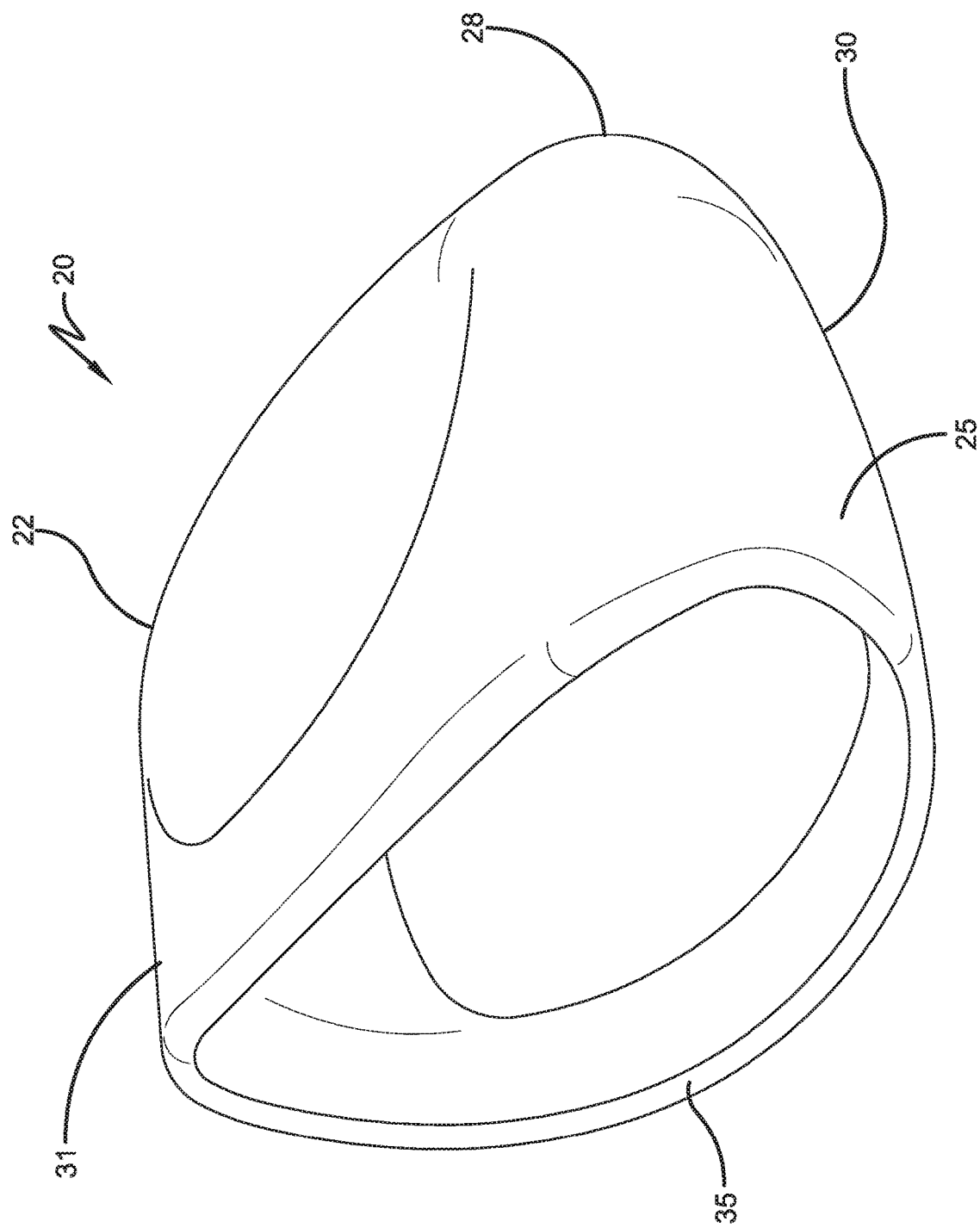
FIG. 4 is a perspective view of the scaffold of FIG. 1.
Figure 5:
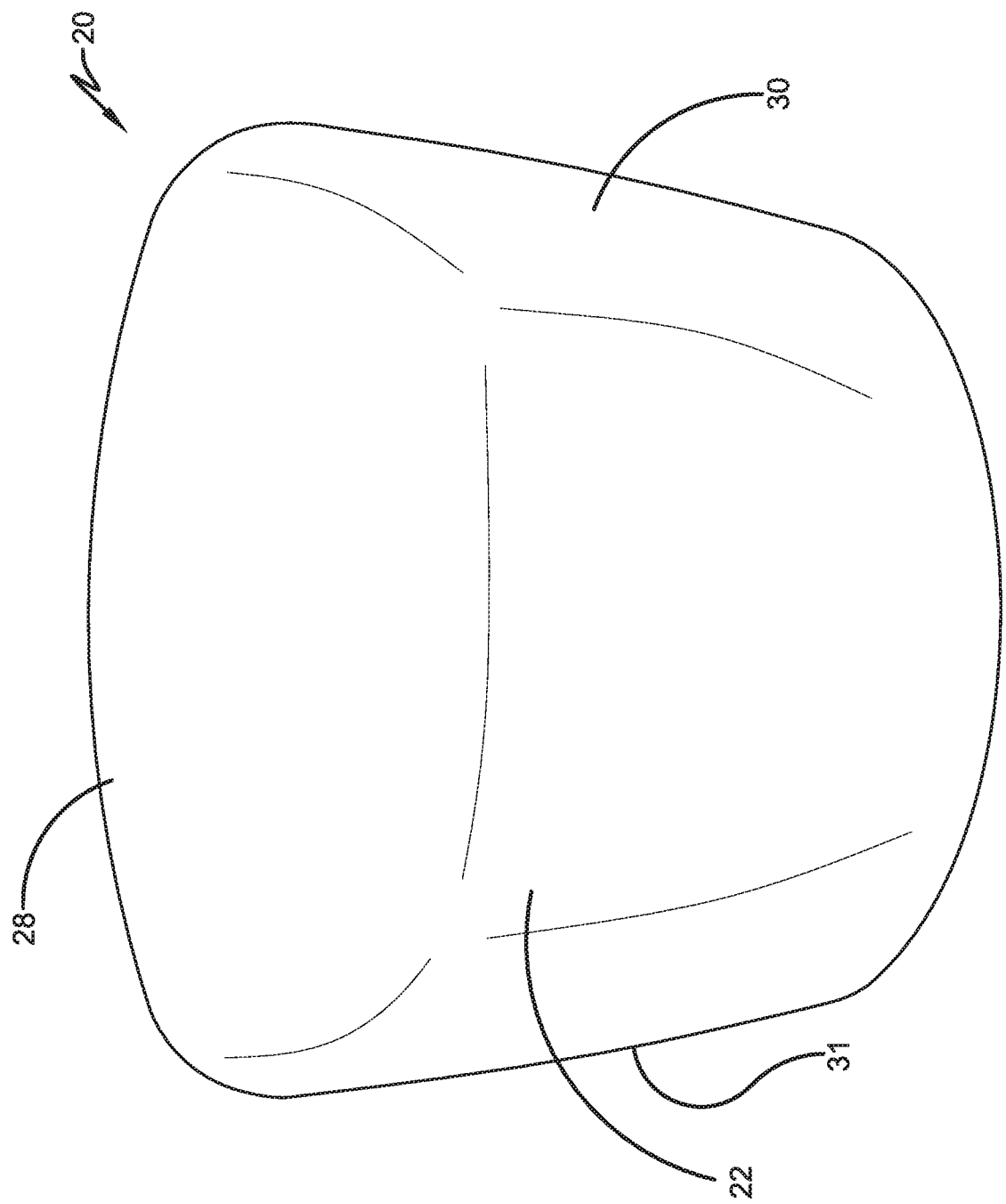
FIG. 5 is a top view of the facial panel and leading edge of the scaffold.
Figure 6:
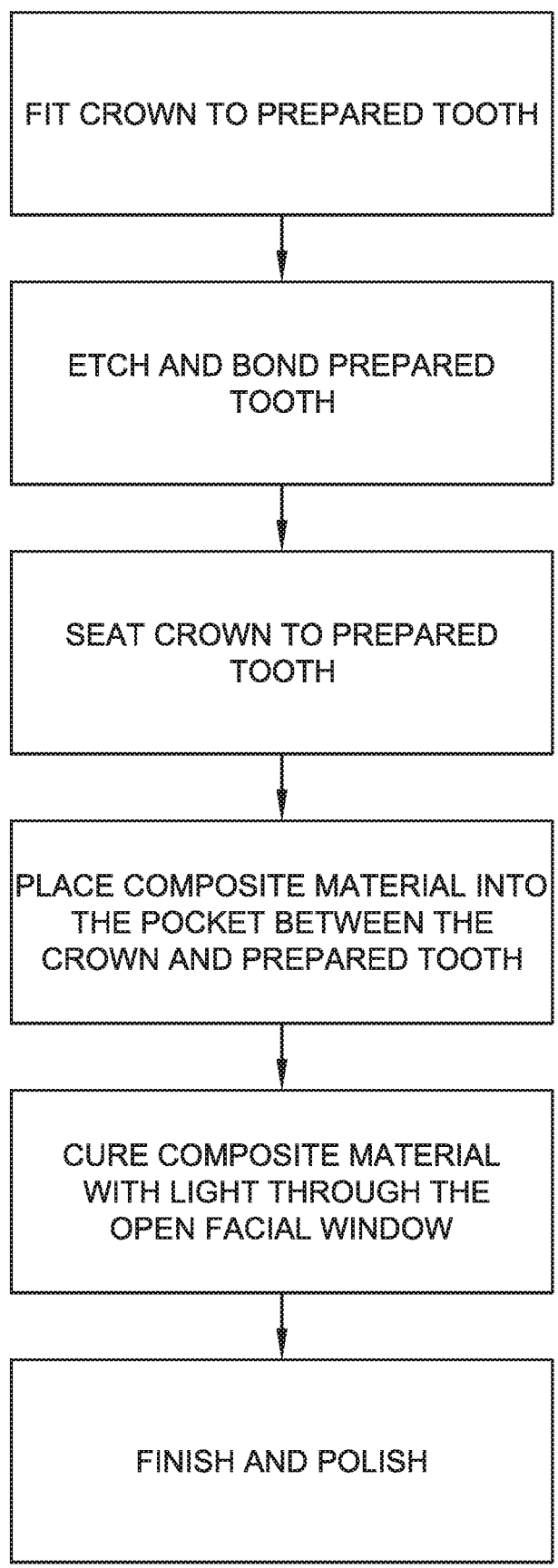
FIG. 6 is a diagram of the various steps in the process of creating the restoration of the present invention.

With reference now to the drawings, and initially to FIGS. 1 through 5, an anterior crown 20, constructed in accordance with the present invention is illustrated from various angles.

In its preferred form, the crown 20 comprises a scaffold or envelope 22, constructed of a formable, non-corrosive material such as stainless-steel. The scaffold 22 is preformed to define a pocket 50 which closely approximates the shape and size of size prepared anterior tooth.

The scaffold 22 is initially formed to its general configuration as previously referenced, such as to define a rearward or palatal panel 24, a facial window 25, joined along a leading edge 28, and defining interproximal walls, or side panels 30 and 31, respectively. Previously, in the prior art, when the initial shape or profile of the scaffold 22 was established, an opening was cut in the facial panel, as is illustrated in U.S. Pat. No. 5,951,294. However, one aspect of the present invention is a new manufacturing method which enables the facial panel 25 to be manufactured with a pre-made opening 33, thereby eliminating the need to create such an opening from a solid facial panel, as described in U.S. Pat. No. 5,951,294. In fact, the opening 33 in the facial panel 25 of this invention is so large, the opening 33 is much larger than the surface area of the facial panel 25, so that the facial panel 25 resembles a border around the opening 33. Specifically, the article 20 is manufactured of a suitable material, such as stainless-steel via metal injection molding, also known as "MIM."

Metal injection molding (MIM) is a metalworking process in which finely-powdered metal is mixed with binder material to create a feedstock that is then shaped and solidified using injection molding. The molding process allows high volume, complex parts to be shaped in a single step. After molding, the part undergoes conditioning operations to remove the binder and densify the powders. Finished products are small components used in many industries and applications.

The ability to combine several operations into one process ensures MIM is successful in saving lead times as well as costs, providing significant benefits to manufacturers. Traditional metalworking processes often involve a significant amount of material waste, which makes MIM a highly efficient option for the fabrication of complex components consisting of expensive alloys, such as stainless steel, as in this application.

With reference to FIGS. 1-6, an opening 33 is preformed into the facial panel, via the MIM process. The opening 33 created in substantially the entire facial panel 25 of the scaffold 22, as perhaps best seen in FIGS. 1-5, so as to define a substantial opening 33 in the facial panel 25, while maintaining structural integrity by providing a circumferential band 35 contiguous with an associated gum line of the associated patient and interconnecting the proximal sides 30 and 31. The specific scaffold 22 is selected from several standard sizes, depending on the size and shape of the associated tooth to be restored.

Having thus selected the structural framework from which the crown of the present invention is to be formed, the patient's tooth to be restored by the said crown is prepared by first removing all unstable material from the tooth which may be the consequence of decay or traumatic damage, and etching the surface of the tooth in any well-known manner to better provide a bonding surface. (FIG. 7 illustrates a tooth T that has been prepared.)

Figure 7:
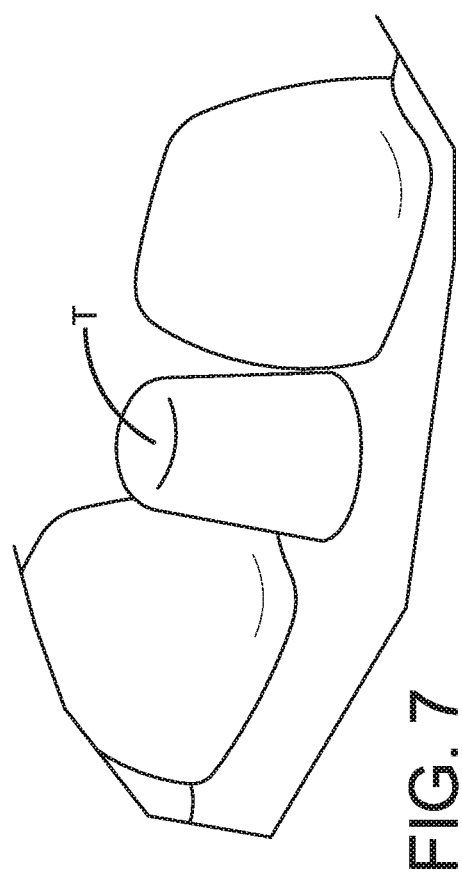
FIG. 7 illustrates the prepared tooth ready for the scaffold (crown) to be fitted.

The scaffold 22 is then placed over the previously prepared tooth T to be restored, as seen in FIG. 7.

Figure 8:
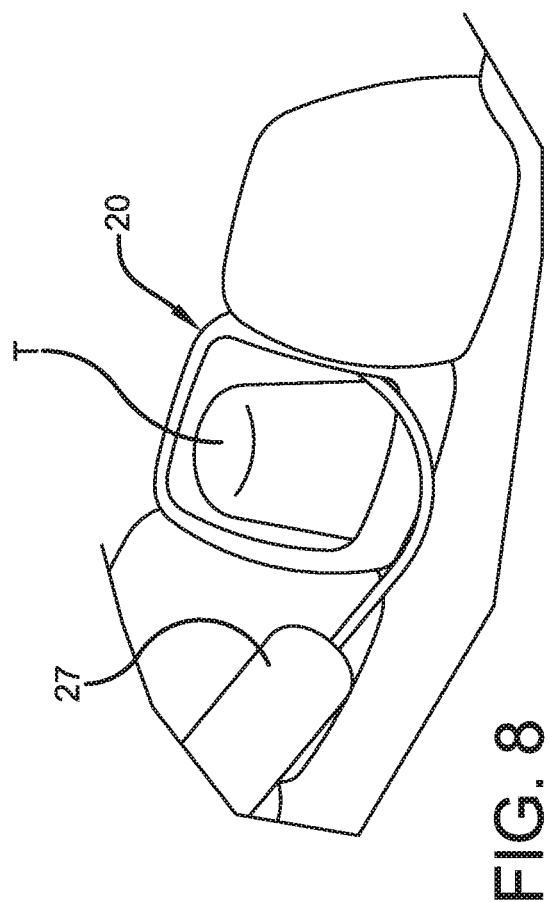
FIG. 8 illustrates filling the space between the prepared tooth and the scaffold (crown) with the flowable, dual cure, bio-active material; and, FIG. 9 illustrates light curing the bonding/filling dual cure composite material.

Once the scaffold 22 has been fitted to the tooth T as seen in FIG. 8, the pocket 50 defined by the interior of the scaffold 22 is filled with a suitable quantity of prepared composite material M, such as by an appropriate syringe 27. Suitable materials can be chosen with the application of sound dental judgment, but the currently preferred material is sold under the brand name Activa and is available from Pulpdent Corporation of Watertown, Mass., USA. The product is described in U.S. Pat. Nos. 6,797,767; 7,157,502; 7,371,782; 8,292,625; 8,535,058; and 8,735; 464, which are incorporated herein by reference. A small quantity of cured excess composite material M will be removed, and the remainder will be shaped and polished.

With reference to FIG. 9, the material will cure, on its own, via the passage of time, or the cure can be speeded up by the application of the appropriate wavelength of light via a source 26 of the light cure gun. The material may be colorized if necessary to, in accordance with this aspect of the invention, to closely approximate the color of teeth of the patient immediately adjacent to the tooth to be restored. In this manner the restorative crown will blend into the overall appearance of the mouth and is distinguished by the casual observer's inability to discern the existence of a restoration.

Also, in accordance with another aspect of the invention, there will be a layer, or a continuum of material, disposed within the confines of the opening 33, defining a film of composite material which transcends the opening 33, the thickness of which is determined by the area between the tooth T, the scaffold, and the cap disposed about the scaffold. Otherwise stated, the composite material M within the confines of the opening 33 will, n accordance with the invention, bond the scaffold to the tooth and completely cover the facial opening 33 of the scaffold and about the leading edge 28, thereby obliterating any hint of the scaffold which lies beneath the material. The obvious result is a restoration which, for all intents and purposes, has the appearance of being a normal tooth.

As shown in FIG. 10, once the composite material M has cured, as a final step in the creation of the prosthesis, the crown 20 is shaped and polished by associated polishing wheel 46 and otherwise finished to provide an aesthetically pleasing and structurally strong restoration, which will last as long as the restored tooth remains and, because of the relatively nominal cost, can be discarded without undue concern when the primary tooth falls out or is removed.

We claim:

1. A method of creating an interim restorative crown for a previously damaged anterior tooth comprising steps of:
   forming a scaffold by metal injection molding (MIM) by creating a feedstock of finely powdered metal mixed with binder material, shaping and solidifying the feedstock using injection molding, and performing conditioning operations to remove the binder and densify the powdered metal;
   fitting the scaffold about said anterior tooth wherein said scaffold defines a pocket, which pocket substantially conforms to the profile of said tooth; said scaffold having an opening therein;
   fitting said scaffold to said tooth such that an empty space exists between the said scaffold and said tooth; and,
   injecting flowable composite material into the said space through the opening.

2. The novel method of claim 1, wherein said composite material is a dual-cure composite material.

3. The novel method of claim 1, wherein said step of filling said scaffold overfills the opening; and further comprising the step of:
   shaping said cured, dual-cure composite material.

4. The novel method of claim 3, further comprising the step of:
   polishing the cured dual-cure composite material.

5. The novel method of claim 1, wherein the opening in the scaffold comprises an opening in a facial panel of said scaffold which further includes substantially all of said facial panel.

6. A method of creating an interim restorative crown for a previously damaged anterior tooth comprising the steps of:
   providing a scaffold having a facial panel comprising an opening preformed into the facial panel;
   fitting the scaffold about said anterior tooth wherein said scaffold defines a pocket, which pocket substantially conforms to the profile of said tooth;
   adding a quantity of composite material to the pocket of said scaffold to bond the scaffold to the tooth and cover the opening of the facial panel of the scaffold;
   curing, finishing and polishing said crown.

7. The method of claim 6, wherein said composite material is a dual-cure composite material.

* * * * *